(12) United States Patent
MacInnis et al.

(10) Patent No.: US 9,363,517 B2
(45) Date of Patent: Jun. 7, 2016

(54) INDEXED COLOR HISTORY IN IMAGE CODING

(71) Applicant: Broadcom Corporation, Irvine, CA (US)

(72) Inventors: Alexander Garland MacInnis, Los Altos, CA (US); Frederick George Walls, Grafton, WI (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/182,172

(22) Filed: Feb. 17, 2014

(65) Prior Publication Data

US 2014/0241630 A1 Aug. 28, 2014

Related U.S. Application Data

(60) Provisional application No. 61/770,979, filed on Feb. 28, 2013.

(51) Int. Cl.
*G06K 9/00* (2006.01)
*H04N 19/103* (2014.01)
(Continued)

(52) U.S. Cl.
CPC ............ *H04N 19/103* (2014.11); *H04N 19/154* (2014.11); *H04N 19/182* (2014.11); *H04N 19/593* (2014.11); *H04N 19/94* (2014.11)

(58) Field of Classification Search
CPC .......... G06K 9/52; H04N 1/417; H04N 1/64; H04N 1/642; H04N 1/648; H04N 9/641; H04N 9/65; H04N 11/02; H04N 11/143; H04N 19/0009; H04N 19/00193; H04N 19/00781; H04N 19/103; H04N 19/124; H04N 19/137; H04N 19/14; H04N 19/149; H04N 19/15; H04N 19/174; H04N 19/18; H04N 19/182; H04N 19/186; H04N 19/196; H04N 19/62; H04N 19/63; H04N 19/65; H04N 19/80; H04N 19/85; G06T 1/60; G06T 9/00; G06T 9/004; G06F 3/1454; G09G 5/02; G09G 5/06; G09G 2340/02
See application file for complete search history.

(56) References Cited

U.S. PATENT DOCUMENTS 5,317,428 A * 5/1994 Osawa et al. ................ 358/539
5,710,826 A * 1/1998 Osawa et al. ................ 358/539
(Continued)

FOREIGN PATENT DOCUMENTS

EP 0495490 A2 7/1992
EP 0734174 9/1996
(Continued)

OTHER PUBLICATIONS

Malvar, Henrique S., et al., Lifting-based reversible color transformations for image compression, SPIE, vol. 7073, 2008, 10 pages.
(Continued)

*Primary Examiner* — Jose Couso
(74) *Attorney, Agent, or Firm* — Brinks Gilson & Lione

(57) ABSTRACT

An encoder may implement an indexed color history that stores color values for previously encoded pixels. The encoder may obtain a current pixel or current group of pixels for encoding and determine whether to encode the current pixel using the indexed color history. In doing so, the encoder may compare a color value of the current pixel with color values of the previously coded pixels to determine whether the current pixel is sufficiently similar to a previously coded pixel color value, e.g., by satisfying one or more similarity criteria. When the similarity criteria are satisfied, the encoder may encode the current pixel as an index value referencing the entry in the indexed color history storing a color value that satisfies the similarity criteria. When the similarity criteria are not satisfied, the encoder may encode the current pixel using another encoding method or technique.

20 Claims, 6 Drawing Sheets

(51) Int. Cl.
*H04N 19/593* (2014.01)
*H04N 19/154* (2014.01)
*H04N 19/182* (2014.01)
*H04N 19/94* (2014.01)

(56) References Cited

U.S. PATENT DOCUMENTS

| | | | |
|---|---|---|---|
| 5,909,383 | A | 6/1999 | Lee |
| 6,621,934 | B1 | 9/2003 | Yu et al. |
| 8,139,882 | B2 | 3/2012 | Huguenel et al. |
| 8,599,214 | B1 * | 12/2013 | Dall et al. ............ 345/601 |
| 2004/0008781 | A1 | 1/2004 | Porter et al. |
| 2004/0028129 | A1 | 2/2004 | Nagumo et al. |
| 2005/0015259 | A1 | 1/2005 | Thumpudi et al. |
| 2005/0069039 | A1 | 3/2005 | Crinon |
| 2005/0254577 | A1 | 11/2005 | Ando |
| 2005/0271288 | A1 | 12/2005 | Suzuki et al. |
| 2006/0140264 | A1 | 6/2006 | Dufour et al. |
| 2006/0227870 | A1 | 10/2006 | Tian et al. |
| 2006/0268012 | A1 | 11/2006 | MacInnis et al. |
| 2007/0009163 | A1 | 1/2007 | Sasaki et al. |
| 2007/0071094 | A1 | 3/2007 | Takeda et al. |
| 2007/0263720 | A1 | 11/2007 | He |
| 2009/0103637 | A1 | 4/2009 | Morley et al. |
| 2009/0110320 | A1 | 4/2009 | Campbell et al. |
| 2009/0135921 | A1 | 5/2009 | Lei |
| 2009/0219994 | A1 | 9/2009 | Tu et al. |
| 2009/0310672 | A1 | 12/2009 | Rao et al. |
| 2010/0067579 | A1 | 3/2010 | Bandoh et al. |
| 2010/0150227 | A1 | 6/2010 | Lee |
| 2010/0232497 | A1 | 9/2010 | MacInnis et al. |
| 2010/0296579 | A1 | 11/2010 | Panchal et al. |
| 2011/0026593 | A1 | 2/2011 | New et al. |
| 2011/0211639 | A1 | 9/2011 | Jones |
| 2011/0255589 | A1 | 10/2011 | Saunders et al. |
| 2011/0255595 | A1 | 10/2011 | Zuo |
| 2011/0310967 | A1 | 12/2011 | Zhang |
| 2013/0034149 | A1 | 2/2013 | Karuchula et al. |
| 2013/0176431 | A1 | 7/2013 | Ogawa et al. |

FOREIGN PATENT DOCUMENTS

| | | |
|---|---|---|
| EP | 2034741 A1 | 8/2006 |
| WO | WO2010/091503 A1 | 8/2010 |
| WO | WO2011/043793 A1 | 4/2011 |
| WO | WO 2012/029208 A1 | 3/2012 |

OTHER PUBLICATIONS

Martucci, Stephen A., Reversible Compression of HDTV Images Using Median Adaptive Prediction and Arithmetic Coding, IEEE, 1990, 4 pages.

International Search Report, App. No. PCT/US2013/063233 dated Jan. 10, 2014, 6 pages.

International Search Report, App. No. PCT/US2013/063237 dated Jan. 30, 2014, 6 pages.

International Search Report, App. No. PCT/US2013/063232 dated Jan. 30, 2014, 6 pages.

Partial European Search Report, App. No. 13004799.6 dated Apr. 7, 2014, 5 pages.

* cited by examiner

INDEXED COLOR HISTORY IN IMAGE CODING

CROSS REFERENCE TO RELATED APPLICATIONS

This application claims priority to provisional application Ser. No. 61/770,979, filed 28 Feb. 2013, which is incorporated by reference in its entirety.

TECHNICAL FIELD

This disclosure relates to image coding. This disclosure also relates to using an indexed color history for encoding or decoding an image.

BACKGROUND

Rapid advances in electronics and communication technologies, driven by immense customer demand, have resulted in the worldwide adoption of devices that display a wide variety of image or video content. Examples of such devices include smartphones, flat screen televisions, and tablet computers. Improvements in image and video processing techniques will continue to enhance the capabilities of these devices.

BRIEF DESCRIPTION OF THE DRAWINGS

FIG. 6 shows an example of logic that a device may implement to encode image data.

FIG. 8 shows an example of logic that a device may implement to decode image data.

DETAILED DESCRIPTION

The discussion below makes reference to image coding using an indexed color history. The techniques and systems described below may improve efficiency in image coding (e.g., encoding or decoding), particularly for finely detailed image content such as text. Image coding using an indexed color history may result in efficiently coded colors (e.g., color values or pixel values) that have previously occurred in an image, such as colors from a previously processed portion of the image, at a previous line or row position in the image, located at a position above, below, to the left, and/or to the right of a current pixel with a particular color, or at other positions. Also, image compression using indexed color history may result in efficiently coding of similar, but not identical, colors that have occurred previously in the image, such as similar colors that match any number of similarity criteria with respect to an original color.

The devices that incorporate, implement, or maintain an indexed color history or perform encoding or decoding using an indexed colored history as described below may take many different forms. As examples, the devices may be set top boxes, cell phones, smart phones, laptop computers, personal data assistants, pocket computers, tablet computers, portable email devices, or processes or threads executed in memory by a processor. Additional examples of devices include televisions, high definition (e.g., Blu-Ray™ or DVD audio) media players, or home media servers. Devices may be found in virtually any context, including the home, business, public spaces, or automobiles.

Figure 1:
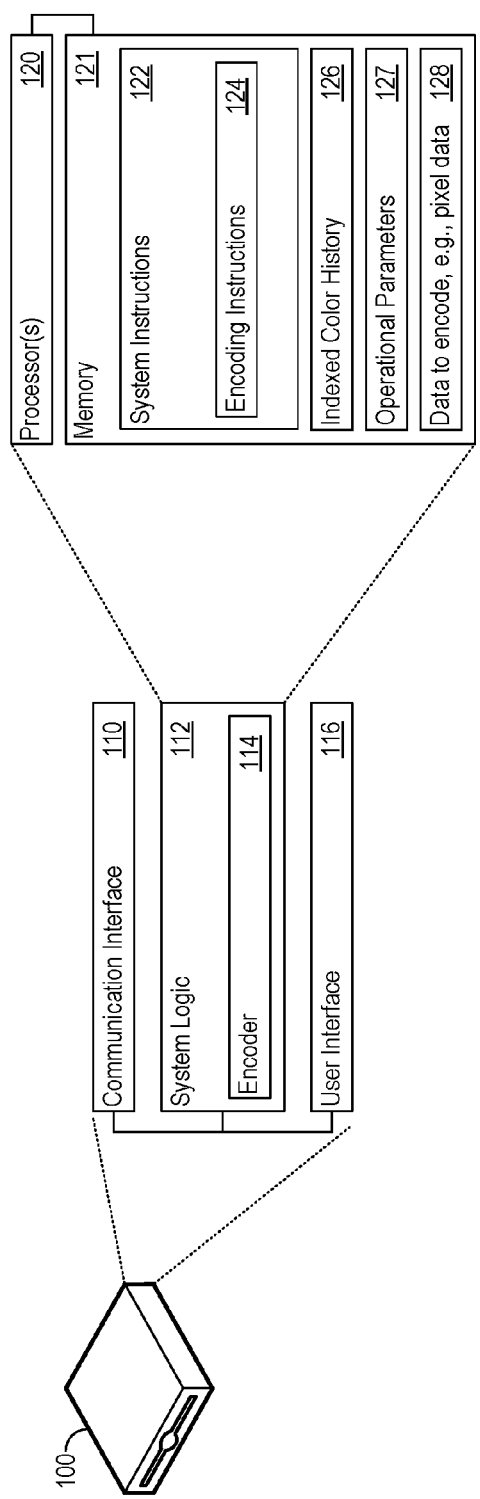
FIG. 1 shows an example of device that performs image processing using an indexed color history.

FIG. 1 shows an example of device 100 that performs image processing, including coding image data using an indexed color history. The device 100 includes a communication interface 110 and a user interface 116. The communication interface 110 may support communication across any of a diverse array of wired or wireless formats, protocols, modulations, frequency channels, bit rates, and encodings. Thus, the communication interface 110 may support communication using the 802.11a/b/g/n/ac standards, the 60 GHz WiGig/802.11TGad specification, Bluetooth, Global System for Mobile communications (GSM), Time Division Multiple Access (TDMA), Frequency Division Multiple Access (FDMA), Code Division Multiple Access (CDMA), Ethernet, cable (e.g. DOCSIS), DSL, Multimedia over Coax Alliance (MoCA), power line (e.g. HomePlug AV), Ethernet Passive Optical Network (EPON), Gigabit Passive Optical Network (GPON), or other wired or wireless access techniques or protocols.

The device 100 includes system logic 112. The system logic 112 may include any combination of hardware, software, firmware, or other logic. The system logic 112 may be implemented, for example, in a system on a chip (SoC), application specific integrated circuit (ASIC), or other circuitry. The system logic 112 is part of the implementation of any desired functionality in the device 100. In the context of coding image data, the system logic 112 may include an encoder 114. The encoder 114 may implement in hardware, software, or both, any of the image processing described below, including coding of image data using an indexed color history. In some implementations, the system logic 112 implements the encoder 114 and an indexed color history in hardware, e.g., as dedicated image processing circuitry.

In some implementations, the system logic 112 includes one or more processors 120 and memories 121. The memory 121 stores, for example, system instructions 122, including encoding instructions 124 that the processor 120 executes to encode image data. The memory 121 may also store the indexed color history (ICH) 126 (e.g., as a hardware register file), operational parameters 127, and data to be encoded 128, e.g., pixel data of an image. Pixel data may refer to or include a color value of the pixel.

The system logic 112 may implement the ICH 126 as a memory (e.g., cache, table, or ordered list) that maintains a set of recently used color values or pixel values. The encoder 114 maintains the ICH 126. The encoder 114 may implement the ICH 126 to store a configurable number of entries. The ICH 126 may store a predetermined number of entries, such as 8, 16, 32, 64, or any other number of entries. Entries in the ICH 126 may store a color indication, such as through a color value or a pixel value. The encoder 114 may represent a color value as a numerical value (or tuple of numbers) part of a color space (or color model) such as the RGB color space, YCbCr color space, YCoCg color space, CMYK color space, or any other color space. In some implementations, the encoder 114 codes image data in YCoCg or YCbCr, depending on the format of the input image. The encoder 114 may convert an RGB input image to YCoCg before encoding. A decoder may convert decoded YCoCg content to RGB before output.

The encoder 114 may implement the ICH 126 such that entries are multiple bit storage locations that hold a color value. A color value may refer to a representation of a color in a particular color space. For example, when coding RGB24 image or video data that has been converted to YCoCg, the Y component of a YCoCg color value may be coded with 8 bits and the Co & Cg components may be coded with 9 bits each. In this example, the ICH 126 may allocate entries in the ICH 126 with 26 bits to store a YCoCg color value. An entry may be wider than necessary for storing a color value. For instance, each entry may be 32 bits wide or 64 bits wide, and thereby facilitate, for instance, seamless operation with other color spaces that use additional bits per color value. As another variation, the encoder 114 may implement ICH entries narrower than the number of bits for storing a color value for a particular color space. In this variation, the encoder 114 may quantize a color value or round the color value to a smaller bit depth to store in narrower entries of the ICH 126.

The encoder 114 may encode image data using ICH coding or non-ICH coding. When performing ICH coding, the encoder 114 may encode image data by referencing the ICH 126, e.g., by representing pixels in an encoded bit stream as index values into the ICH 126. When performing non-ICH coding, the encoder 114 may encode image data using a different coding method without referencing the ICH 126, examples of which include the coding methods described in U.S. application Ser. No. 12/720,273, filed Mar. 9, 2010, and U.S. application Ser. No. 14/044,627, filed Oct. 2, 2013, both of which are hereby entirely incorporated by reference herein. For example, the encoder 114 may utilize any of the predictive encoding methods described in U.S. application Ser. No. 14/044,627 when performing non-ICH coding.

Figure 2:
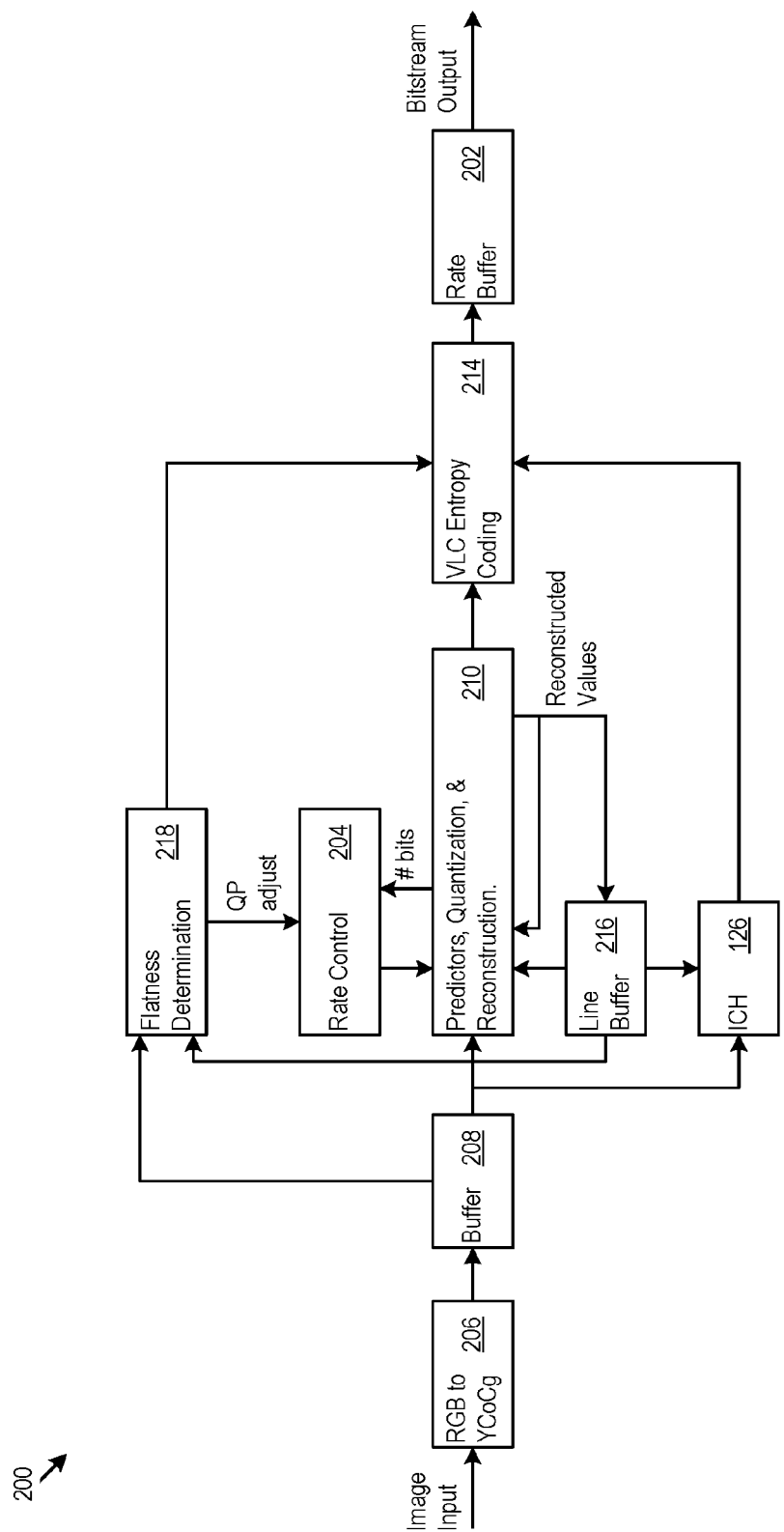
FIG. 2 shows an example architecture of an encoder.

FIG. 2 shows an example architecture 200 of an encoder 114. The exemplary architecture 200 may support encoding pixels using either predictive coding or ICH coding.

The encoder 114 may generate bitstreams that may precisely conform to an independently specified bpp (bits per pixel) rate. The bpp rate may be specified in terms of bits per pixel time. Bits per pixel time may be algorithmically specified, as the unit of a pixel time may be the same at both the input and output of the encoder 114. The number of bits that code each pixel, or group of pixels, may vary considerably. In the exemplary architecture 200, the rate buffer 202 facilitates converting the variable number of bits used to code each group into, e.g., a constant bpp rate. To that end, the encoder 114 may include the rate controller 204. The rate controller 204 may determine whether to increment, decrement, or leave unchanged the quantization step.

The encoder 114 may include color space conversion logic 206, e.g., RGB input to reversible YCoCg conversion logic. An input buffer 208 may store the converted input. Also shown in FIG. 2 is a prediction, quantization, and reconstruction (PQR) logic 210 that implements prediction of sample values and generation of residual values. In some implementations, the PQR logic 210 predicts and quantizes pixel components, resulting in quantized residuals. The PQR logic 210 may predict a pixel component from previously encoded and reconstructed pixel components, and may include multiple (e.g., three) predictors: modified median adaptive prediction (MMAP), mid-point prediction (MPP), and block prediction (BP). The PQR logic 210 also implements quantization of residual values and reconstruction of sample values.

Also present in FIG. 2 is the variable length coder (VLC) logic 214, which may implement entropy coding using delta size unit variable-length coding (DSU-VLC). The VLC logic 214 may, for example, may code the quantized sample values using their natural 2's complement binary values. The number of bits that the mapping and variable length coder 206 uses to code each value may be determined dynamically by a combination of recent history of coded values of the same pixel component and a prefix value associated with each unit of samples. The input buffer 208 may provide samples to the flatness determination logic 218.

The exemplary architecture 200 shown in FIG. 2 includes the ICH 126. The encoder 114 determines whether to encode pixel data using the ICH 126 or according to another encoding method. In some variations, the encoder 114 determines whether to encode pixels using ICH coding or non-ICH coding on a per-group basis. The encoder 114 may identify a group of pixels as, for example, 1, 2, 3, 4, 6, 8, or any other number of pixels organized in any way, e.g., across a scan line, in a particular portion of an image, in a one-dimensional or multi-dimensional (e.g., 2 dimensional) arrangement, whether wholly contiguous or non-contiguous, or in other ways. For example a group of 8 pixels may be two sets of 2×2 contiguous pixels, with each set being contiguous or non-contiguous with the other set. As another example, the group of 8 pixels may be a contiguous 2×4 block of pixels.

The encoder 114 may select the use of ICH coding using any of a variety of algorithms or criteria, any of which may be specified in the operational parameters 127. The selection algorithm or criteria employed by the encoder 114 need not be embodied in a decoder. As described in greater detail below, the encoder 114 may indicate in an encoded bit stream whether an input pixel or group of input pixels was encoded using ICH coding or another encoding method.

In some implementations, the encoder 114 determines whether to use ICH coding for a group of input pixels according to similarity criteria with respect to entries in the ICH 126. Put another way, the encoder 114 may determine to use ICH coding for a current input pixel when an entry in the ICH 126 meets the similarity criteria with respect to the current input pixel. The encoder may 114 may determine to use ICH coding for a group of pixels when a threshold number or percentage (e.g., all) of the input pixels in the group meet the similarity criteria. In that regard, the encoder 114 may compare the color value of the input pixel(s) to the color values stored in entries of the ICH 126.

The encoder 114 may apply one or more similarity criteria with respect to the difference between the color value of an input pixel to be coded and the color value of an entry in ICH 126, some examples of which are presented next. As a first example, the encoder 114 may determine whether a difference between color values exceeds a difference threshold, e.g., as measured between one or more components of a color space or as measured by the distance between two color values in the color space. Similarity criteria may be satisfied when the difference between one or more components, or the sum of the difference (e.g., absolute difference) between one or more components, or any selected function of the component(s) is less than the difference threshold. In that regard, entries in the ICH 126 may satisfy the similarity criteria when the color value of the input pixel to be coded differs in color value from that of one or more entries in the ICH 126 by less than a difference threshold, e.g., when the color value of input pixel is within a difference threshold from the color value of an entry in the ICH 126.

In some variations, the similarity criteria may specify a common difference threshold applicable to one or more components of a color value, e.g., a common difference threshold for the Y, Co, and Cg component comparisons between the input pixel and ICH 126 entries. In other variations, the similarity criteria may specify respective difference thresholds applicable to individual components of a color value, e.g., a first difference threshold applicable to Y component comparisons, a second difference threshold applicable to Co component comparisons, and a Cg difference threshold applicable to Cg component comparisons. As another alternative or additional variation, the similarity criteria may specify particular difference thresholds specific to different pixels in a group.

The encoder 114 may determine the difference threshold as a function of one or more variables used in non-ICH coding. As examples, the encoder 114 may identify the difference threshold as the maximum, minimum, or average error that may be obtained from encoding pixels in a group using a non-ICH coding method. In these situations, the similarity criteria may include error criteria. To provide one illustration in the context of quantization, the encoder 114 determines the difference threshold as a function of a quantization parameter (QP) that would apply to a current pixel or current pixel group were the encoder 114 to use non-ICH coding, e.g., predictive coding. In this illustration, a non-ICH coding algorithm may specify using a QP value of 4 for the first pixel and a QP value of 5 for the second and third pixels in a three pixel group. The corresponding maximum quantization errors may be $2^4/2=8$ for the first pixel and $2^5/2=16$ for the second and third pixels. The encoder 114 may apply a difference threshold of 8 for the components of the first pixel and a difference threshold of 16 for components of the second and third pixels, when comparing with entries in the ICH 126. Thus, the encoder 114 may determine whether the similarity criteria is satisfied by determining whether the absolute difference for each component for an input pixel to be coded and an entry in the ICH 126 exceeds these difference thresholds. In this particular illustration, the encoder 114 determines the similarity criteria is satisfied when, for example, the absolute value of the difference between the color value components of the input pixel and the color value components of the color value of an entry in the ICH 126 differ by less than the difference threshold, e.g., by 8 for comparisons with color value components of the first pixel and by 16 for comparisons with color value components of the second and third pixels.

As additional examples of similarity criteria, the encoder 114 may apply a difference threshold value other than the maximum currently applicable quantization error. For example, when a maximum quantization error exceeds a predetermined error level (e.g., threshold value), the encoder 114 may apply a difference threshold less than the maximum currently applicable quantization error. When the maximum quantization error does not exceed the predetermined error level, the encoder 114 may apply a difference threshold equal to the maximum currently applicable quantization error As one illustration, if QP=5 and the maximum error is 16, and an predetermined error level is 8, the encoder 114 may apply a difference threshold value of less than 16, for example 8. If QP=4 and the maximum error is 8, then the encoder may apply a difference threshold value equal to the maximum error, which is 8.

In some variations, satisfaction of the similarity criteria requires an identical match between color values of an input pixel and an entry in the ICH 126. That is, the encoder 114 may determine satisfaction of the similarity criteria when an entry in the ICH 126 identically matches the input pixel. As yet another variation, the similarity criteria may require an exact match for one or more color components between the input pixel and an ICH 126 entry. In this variation, the encoder 114 may determine satisfaction of the similarity criteria when one or more components of the input pixel identically match with respective components of an ICH 126 entry.

The encoder 114 may apply multiple criteria in determining to use ICH coding for a pixel or group of input pixels. As one example, the encoder 114 determines whether to select encoding in ICH mode for a group based on one or more conditions, such as when the following two conditions are met:

(1) for each pixel in the group, there is at least one entry in the ICH 126 that meets the similarity criteria; and (2) an estimated number of bits that would be spent coding the group ("bit cost") in ICH mode is less than an estimated number of bits that would be spent coding the group using the non-ICH mode.

As an additional or alternative example to condition (2) above, the encoder 114 may apply a criterion to select between ICH mode and non-ICH mode based on the bit cost for the pixel group and one or more additional parameters, such as error caused by using the coding mode. Coding the pixel group in ICH mode may introduce error in an input pixel when the color value for an entry in the ICH 126 referenced to code the input pixel differs from the color value of the input pixel, and the error for an input pixel may be 0 when the color value of the referenced entry in the ICH 126 identically matches the color value of the input pixel. In that regard, error may refer to the difference between the color value of the input pixel and the coded color value resulting from a particular coding mode. Coding in non-ICH modes may introduce error caused by quantization or reconstruction of color values, for example. In these examples, the encoder 114 may weigh respective error resulting from using ICH coding or non-ICH coding, and factor in the error when determining whether to use ICH coding or non-ICH coding.

In some implementations, the encoder 114 compares an output of a function of the bit cost and error applied to ICH coding of a pixel group using one or more entries of the ICH 126 versus a corresponding function of bit cost and error applied to non-ICH coding of the pixel group. Put another way, the encoder 114 may weigh both bit cost and accuracy (e.g., as indicated through a function of error) when determining whether to use ICH mode or non-ICH mode to code a pixel group. As one particular example, the encoder may compare the output of the following function: "bit cost+ 4*sum (ceil($\log_2$(maxAbsError+1)))", where the maxAbsError refers to a maximum absolute error on a per-component basis and the sum is over the components. The encoder 114 may select ICH coding when the function output for one or more entries in the ICH 126 is less than the corresponding function output when using non-ICH coding. The encoder 114 may apply any variation of functions to compare between ICH coding and non-ICH coding of the input pixel group, accounting for factors such as bit cost, error and/or accuracy, throughput, processing time, power consumption, or any number of other parameters.

The encoder 114 may apply a different function to the estimated bit cost and error using ICH coding than to the estimated bit cost and error using non ICH coding. For example, the encoder may determine whether to use ICH coding or non-ICH coding by applying a first function to bit cost and error using ICH coding (or any additional or alternative inputs to the first function), applying a second function to the bit cost and error using non-ICH coding (or any additional or alternative inputs to the second function), and comparing the outputs. As another option, the encoder 114 compares respective function outputs for the estimated bit cost and error using ICH coding and using non-ICH coding, and determines to use a particular coding method when the function outputs differ by at least a predetermined threshold.

When both of the above conditions are met, the encoder 114 may select ICH coding to code the group. In some variations, the encoder 114 may estimate the number of bits spent using a non-ICH mode based on one or both of the input values in the same scan line as the input pixels of the group and the reconstructed values of the previous scan line. For example, the encoder 114 may estimate the number of bits that would be used to code the prediction residual of each pixel in the group, where the prediction is based on the input and reconstructed values.

Upon determining to use ICH coding for a group of input pixels, the encoder 114 may select a respective index into the ICH 126 to represent the input pixels. In some implementations, the encoder 114 may encode the input pixel as an index value identifying the entry in the ICH 126 that meets the similarity criteria for the input pixel. When the ICH 126 includes more than one entry that meets the similarity criteria with respect to an input pixel, the encoder 114 may apply additional criteria in selecting a particular entry from among the multiple entries that satisfy the similarity criteria. As one implementation, the encoder 114 selects the entry in the ICH 126 that produces the lowest sum of absolute differences of per-component errors. In other implementations, the encoder 114 selects the ICH entry that produces the lowest absolute error in one component, for example the Y component of a YCbCr color space. The encoder 114 may apply additional or alternative criteria specifying a comparison of any function of an input pixel and entries in the ICH 126, and as additional examples, specify selecting the entry with the lowest weighted sum of absolute differences of per-component errors or lowest sum of per-component errors squared.

In some implementations, the encoder 114 may apply a different set of similarity criteria when selecting an index into the ICH 126 to represent an input pixel (which may be referred to as selection similarity criteria) than when determining that the ICH 126 includes at least one entry meeting similarity criteria with respect to an input pixel (which may refer to inclusion similarity criteria). Thus, the encoder 114 may determine a selected index into the ICH 126 for representing an input pixel (e.g., by applying selection similarity criteria) separately from determining whether the ICH 127 includes at least one entry with a color value sufficiently similar to the input pixel (e.g., within a specified similarity threshold specified by the inclusion similarity criteria). The selection similarity criteria and the inclusion similarity criteria may respectively include any combination of the similarity criteria discussed above.

The encoder 114 may determine selected index or indices into the ICH 126 for representing the respective pixels of an input pixel group prior to determining whether to code the input pixel group using ICH coding or non-ICH coding. To illustrate, the encoder 114 may determine selected indices into the ICH 126 using selection similarity criteria to respectively code the input pixels of the group and then determine whether to select encoding in ICH mode for a pixel group when the following two conditions are met:

(1) for each pixel in the group, there is at least one entry in the ICH 126 that meets the inclusion similarity criteria; and (2) for the selected indices into the ICH 126 determined using the selection similarity criteria, an output value of a function of the bit cost and error using the selected indices is less than the output of the function of the bit cost and error using non-ICH coding (or less by at least a predetermined threshold).

Thus, in some implementations, the encoder 114 may determine the selected indices into the ICH 126 that would be used to represent input pixels in ICH coding prior to determining whether to use ICH coding or not. In this case, when the two conditions are met, the encoder 114 may encode the pixel group by representing the input pixels as the selected indices. In other variations, the encoder 114 may determine the selected indices into the ICH 126 for representing an input pixel group using the selection similarity criteria in parallel with or after determining whether to code the input pixel group using ICH coding, e.g., as described above.

Figure 3:
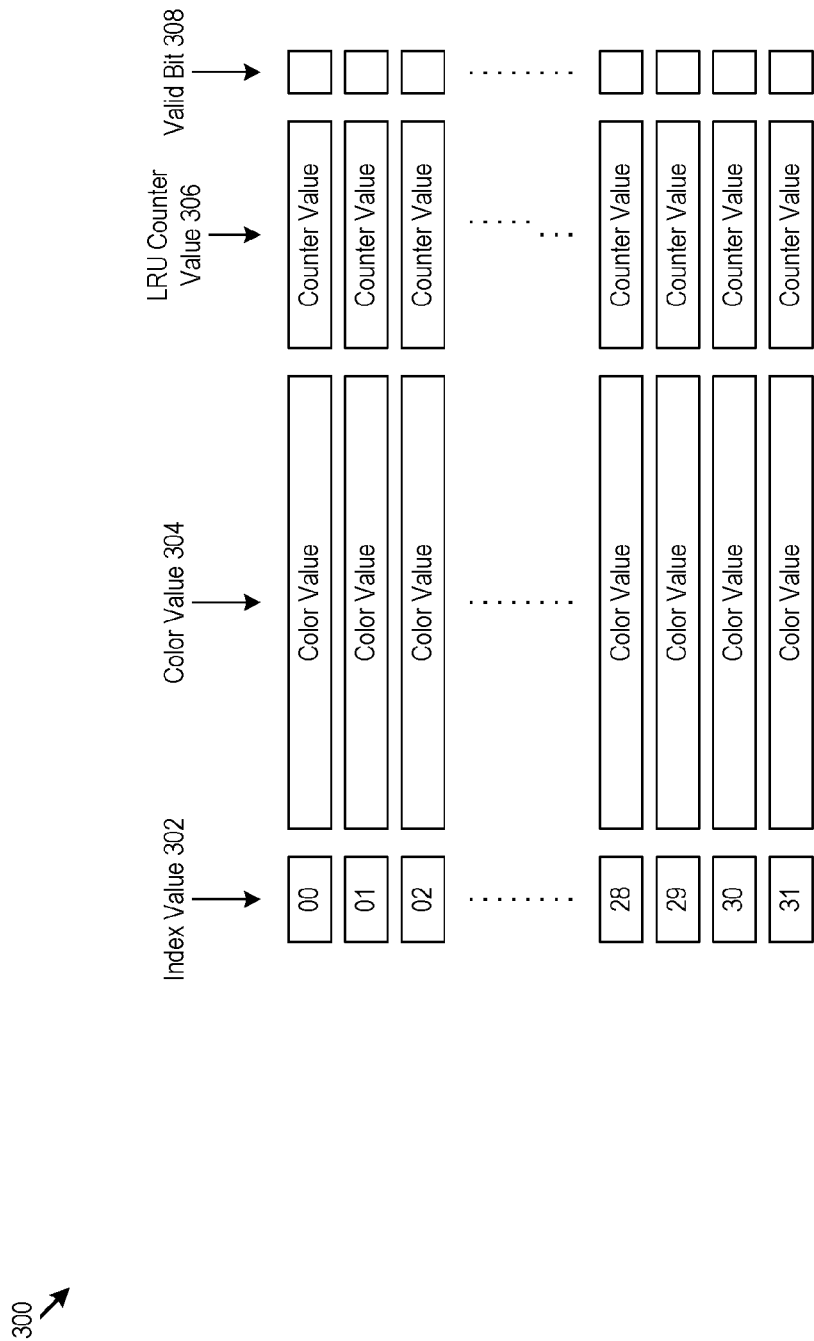
FIG. 3 shows an exemplary representation of the indexed color history.

FIG. 3 shows an exemplary representation 300 of the ICH 126 that the encoder 114 may implement. The ICH 126 shown in FIG. 3 includes entries with an index value 302 and a color value 304. In FIG. 3, the ICH 126 includes 32 entries and entries are identified with a respective index value 302. Put another way, an index value 302 points to or corresponds with a particular entry in the ICH 126, whether stored explicitly in the entry or otherwise identifying a particular entry, e.g., as an offset from the first entry in the ICH 126.

The encoder 114 may initialize the ICH 126 in response to an initialization condition, e.g. upon occurrence of one or more pre-determined events. Examples of initialization conditions include identifying the start of an input image (compressed or non-compressed), start of a slice of an image, or start of a scan line. The encoder 114 may set the ICH 126 in an initial state, e.g., such that the ICH 126 stores no valid entries. The encoder 114 may flush the contents of the ICH 126 upon initialization, or the encoder 114 may implement the ICH 126 such that entries include a valid bit 308 as shown in FIG. 3. The valid bit 308 of a particular entry may indicate whether the particular entry is in a valid state or invalid (e.g., unused) state. During initialization, the encoder 114 may clear the valid bit 308 of entries in the ICH 126 in addition to or as an alternative to flushing previous content in the entries.

The encoder 114 may enter color values into the ICH 126 for pixels coded using non-ICH coding. For these pixels, the encoder 114 may examine the pixel's color value (e.g., reconstructed pixel value when using predictive coding) and determine whether to insert the color value into the ICH 126, e.g., as an entry into the ICH 126. In doing so, the encoder 114 may apply any number or entrance criteria or conditions. The encoder 114 may forego inserting the color value of a non-ICH coded pixel when the ICH 126 already includes a valid entry with a color value 304 meeting one or more similarity criteria with respect to the color value of the non-ICH coded pixel. When there are no valid entries in the ICH 126 with a color value 304 meeting similarity criteria of the color value of the non-ICH coded pixel, the encoder 114 may insert the color value of the non-ICH coded pixel into the ICH 126. In determining whether to insert the color value of the non-ICH coded pixel into the ICH 126, the encoder 114 may apply any combination of the similarity or error criteria such as those described above. The encoder 114 may apply the same, partially overlapping, or different similarity criteria when determining whether to use ICH-coding and determining whether to insert the color value of a non-ICH coded pixel into the ICH 126.

When there are unused (e.g., invalid) entries in the ICH 126, the encoder 114 may insert the color value of the non-ICH coded pixel by allocating an unused entry and assigning it the color value of the non-ICH coded pixel. The ICH 126 may set a value associated with the newly assigned entry to indicate the inserted color value was most recently used (MRU). In one variation, the encoder 114 maintains a counter. The encoder 114 may reset the counter at defined events, for example at the beginning of a slice or the beginning of a scan line. The counter may comprise a number of bits. Entries in the ICH 126 may include a counter field that stores a value of the counter. In FIG. 3, entries in the ICH 126 include a respective counter value, labeled as least recently used (LRU) counter values 306. The encoder 114 may increment the counter for each pixel coded by the encoder 114. The encoder may increment the counter for each pixel encoded using ICH coding or at any other configurable rate. When an ICH 126 entry matches the similarity criteria or is newly inserted, the encoder may copy the current value of the counter as the entry's LRU counter value 306 to indicate that the entry was recently used.

When all ICH 126 entries are valid before inserting the color value of a non-ICH coded pixel, the encoder 114 may replace an entry in the ICH 126. The encoder 114 may employ a replacement algorithm, such as the LRU replacement algorithm. When the encoder 114 determines to insert a new color value into the ICH 126, the encoder 114 may identify the LRU entry as the entry with the smallest counter value, e.g., as stored in the LRU counter value 306 of an entry. The encoder 114 may allocate a number of bits to the counter such that the maximum counter value is greater than or equal to the number of pixels between successive counter reset events. In some implementations, the encoder 114 increments the counter for each group (e.g., instead of for each pixel). In these implementations, the encoder 114 may allocate a number of bits to the counter such that the maximum counter value is greater than or equal to the number of groups between successive counter reset events.

The encoder 114 may employ any replacement algorithm in determining an entry to replace in the ICH 126. The encoder 114 may utilize alternate replacement algorithms such as not recently used (NRU) or first in first out (FIFO). The encoder 114 may implement LRU in other variations besides including an LRU counter value for ICH 126 entries.

Figure 4:
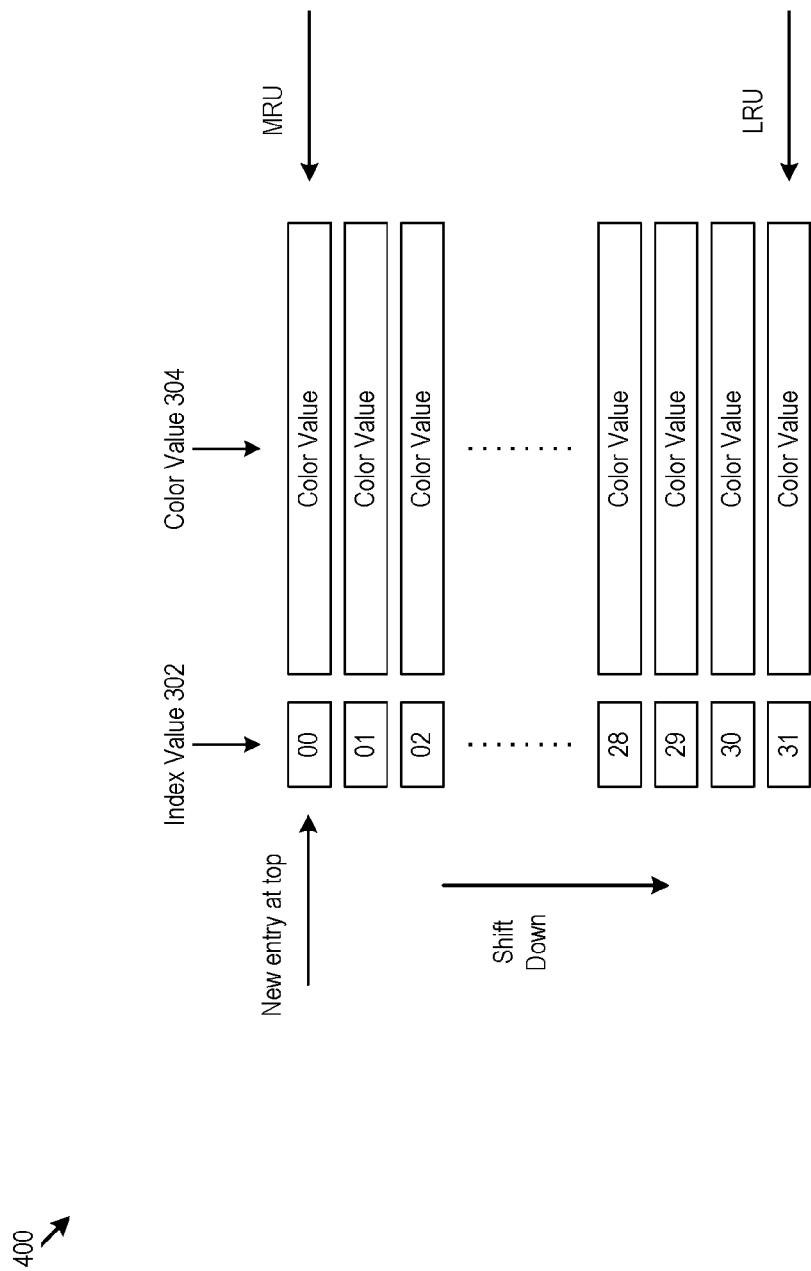
FIG. 4 shows another exemplary representation of the indexed color history.

FIG. 4 shows another exemplary representation 400 of the ICH 126 in which the encoder 114 may implement the ICH 126 as an ordered list. An ordered list may indicate which color values are MRU and LRU based on a position of an entry in the ordered list. The ICH 126 may identify the inserted color value as the most recently used value, e.g., through the encoder 114 inserting the entry for the new color value at the head of the ordered list with older entries shifted down. As an exemplary implementation, the encoder 114 may manage the ICH 126 as a shift register where the most-recently used color values are at the top and the least-recently used color values are at the bottom. New entries are added at the top and all other entries are shifted down, with the bottom entries falling out of the ICH 126.

In some variations, the encoder 114 inserts a new color value into the ICH 126 without examining whether any similar color values (e.g., that meet similarity criteria) are already present in the ICH 126. Put another way, the encoder 114 may insert an entry for the color value of a non-ICH coded pixel into the ICH 126 unconditionally, e.g., without applying any entrance criteria. In doing so, the encoder 114 may reduce the complexity and/or latency of inserting color values into the ICH 126 as insertions into the ICH 126 can be done without the overhead of implementing additional comparison logic and without the latency of performing the comparisons.

In other variations, the encoder 114 inserts the new color value of the non-ICH coded pixel into the ICH 126 and examines older entries in the ICH 126 to determine whether an entry (or entries) meets similarity criteria with respect to the new color value. When the encoder 114 identifies one or more entries (e.g., color values) meeting the similarity criteria, the encoder 114 may remove these entries from the ICH 126. When the encoder 114 removes a color value from the ICH 126, older entries may be moved forward by one position in the ordered list, e.g., in a MRU direction. In this way, when a new entry (e.g., new color value) is identical to an older entry (e.g., old color value), the effective result may be marking the older color value as the most recently used, e.g., as the new entry is now at the head of the ordered list.

In one variation, the encoder 114 determines whether an existing entry in the ICH 126 meets similarity criteria with respect to the new color value of a non-ICH coded pixel. When a particular entry in the 126 meets the similarity criteria, the encoder 114 indicates that particular entry as most recently used (e.g., by moving the particular entry to the top of the ICH 126 listing) and does not insert the new color value into the ICH 126. Associated with moving the particular entry to the top, entries that were above (e.g., newer than) the particular entry are moved down by one position. In another variation, the encoder 114 determines whether an existing entry in the ICH 126 meets similarity criteria with respect to the new color value of a non-ICH coded pixel. When a particular entry in the 126 meets the similarity criteria, the encoder 114 updates the value of that particular entry to correspond to the new color value and indicates that particular entry as most recently used (e.g., by moving the particular entry to the top of the ICH 126 listing). Associated with moving the particular entry to the top, entries that were above (e.g., newer than) the particular entry are moved down by one position.

The encoder 114 may maintain the ICH 126 when using ICH coding to encode pixel data. When the encoder 114 encodes a group using ICH coding, the indices used to code input pixels reference entries in the ICH 126. When an ICH 126 entry is referenced and used to encode an input pixel, the encoder 114 may indicate the referenced entry as MRU, e.g., by moving the referenced entry to the top of the ICH 126 and shifting the other values above the prior location of the entry down by 1. The encoder 114 may perform this operation in parallel for all entries of an ICH coded group, with one or more ICH entries being moved to the top of the list (e.g., MRU position) with a specified relative order. The last pixel value of the group may become the MRU, for example, with the next earlier pixel of the same group becoming the second MRU, and so on, e.g., if there are more than 2 pixels in a group. The last pixel of the group may be the pixel represented as the rightmost pixel in a syntactical description.

The encoder 114 may allocate a particular portion of the ICH 126 to store color values for a specific set of pixels instead of storing recently used color values. One illustration for a 32-entry ICH 126 is provided next in FIG. 5. For the first line of a slice, or other predetermined portion of image data, the encoder 114 may treat the 32 entries of ICH 126 for storing the recently used color values, e.g., as described in relation to FIG. 4 above. For lines after the first line of a slice, the encoder 114 may define a set of index values to store color values associated with selected pixel locations. For example, these may be pixel locations near (e.g., within a particular distance from) the current pixel in the line above the current line. This set of index values may not be treated as recently used entries ordered according to MRU and LRU. This is useful for efficient coding of pixel values that are not in the ICH 126, and it improves coding with some content.

Figure 5:
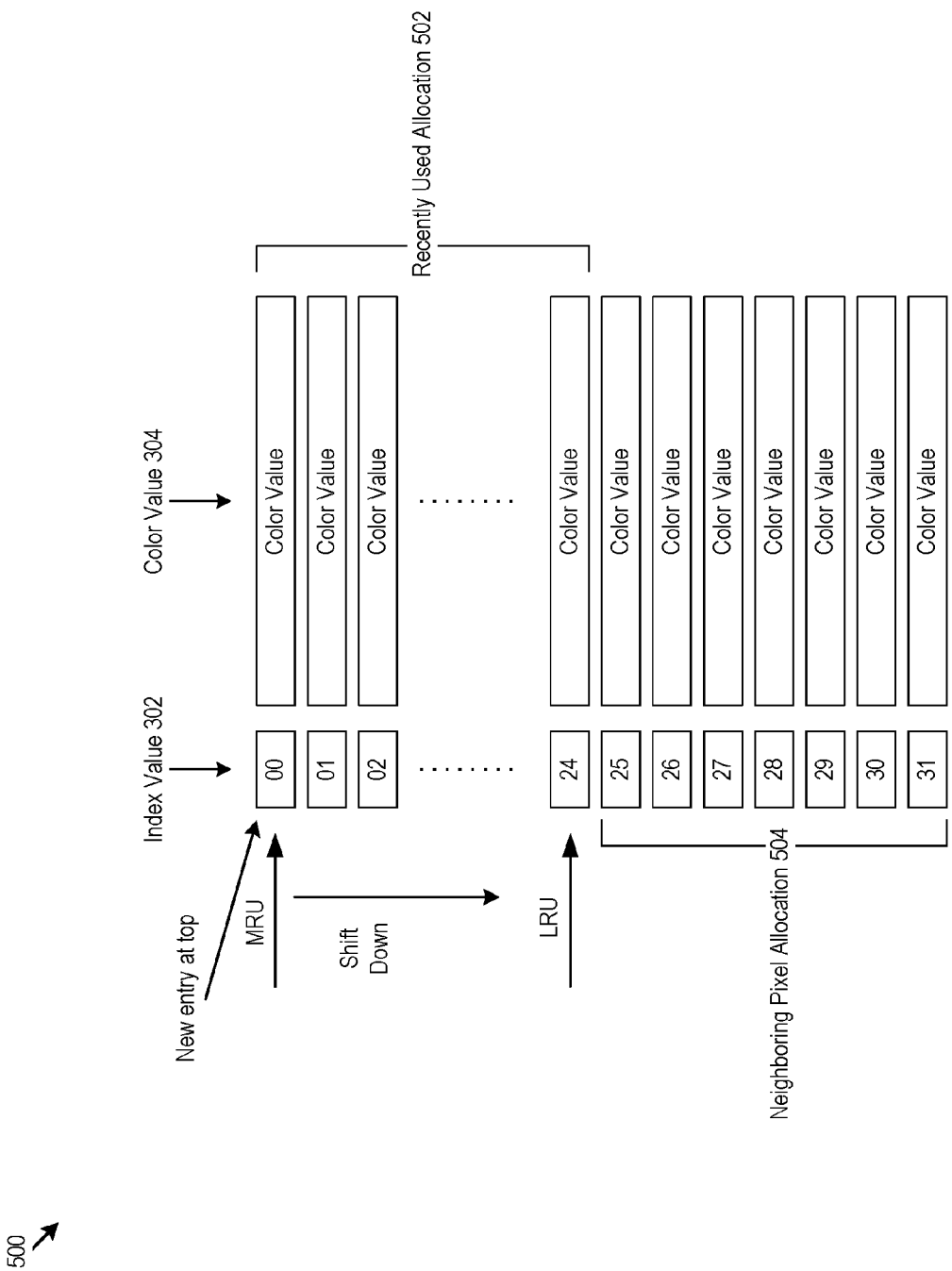
FIG. 5 shows an exemplary representation of the indexed color history.

FIG. 5 shows an exemplary representation 500 of the ICH 126. The encoder 114 may partition the ICH 126 into different portions, where entries in specific portions store color values associated with a specified set of pixels. In FIG. 5, the encoder 114 allocates a first portion of the ICH 126 as a recently used allocation 502 and a second portion of the ICH 126 as a neighboring pixel allocation 504. In a particular example shown in FIG. 5, the encoder 110 allocates the bottom seven entries in the ICH 126 as the neighboring pixel allocation 504 to store color values of selected pixels neighboring a current pixel group to be coded, i.e., index values 25-31. The encoder 114 may update the color value stored in these neighboring pixel entries as the encoder 114 codes subsequent pixel groups. As one example of entries in the neighboring pixel allocation 504, the encoder 114 may store the color values of the seven pixels in the line above a current group of three input pixels, e.g., the seven pixels in the line above centered about the current group.

The encoder 114 may utilize the first 'n' (e.g., 25 in this example) entries in the ICH 26 to implement the ordered list of recently used color values, e.g. entries of the recently used allocation 502 corresponding to index values 00-24 in the ICH 126 in FIG. 5. When performing ICH coding, the encoder 114 may code pixels using index values from the recently used allocation 502 (e.g., entries for index values 00-24) or the index values for entries in the neighboring pixel allocation 504 of the ICH 126 (e.g., entries for index values 25-31).

The ICH 126 may store different color values in partitioned portions in the ICH 126. For example, the color values stored in the recently used allocation 502 may differ in part or completely from the color values stored in the neighboring pixel allocation 504. In one embodiment, when the encoder 114 codes a pixel as an index value to an entry in the neighboring pixel allocation 504 of the ICH 126, the encoder 114 may insert the color value of the indicated neighboring pixel into the recently used allocation 502 of the ICH 126 as the MRU color value. In another embodiment, the encoder 114 may forego inserting the color value of the indicated neighboring pixel when the encoder 114 codes a pixel by referencing the index value in the neighboring pixel allocation 504 of the ICH 126. In this embodiment, the color value of the indicated neighboring pixel is not entered into the recently used allocation 502 of the ICH 126.

FIG. 6 shows an example of logic 600 that the device 100 may implement to encode image data. The encoder 114 may implement the logic 600 as hardware, software, or both, e.g., in software as the encoding instructions 124.

The encoder 114 may initialize the ICH 126 (602). For example, the encoder 114 may initialize the ICH 126 in response to an initialization condition, e.g., at the start of encoding an input image or particular portion of the input image. To initialize the ICH 126, the encoder 114 may flush the contents of the ICH 126 or mark the entries of the ICH 126 as invalid or unused. As another variation, the encoder 114 may initialize the ICH 126 by setting the contents (e.g., the color values) of the ICH 126 to a predetermined configuration. The encoder may obtain input data to encode, such as a group of input pixels for encoding (604).

The encoder 114 determines whether to encode the group of input pixels using ICH coding or non-ICH coding (606). ICH coding may be determined on a per-group basis by the encoder 114, and according to any number of criteria including the similarity, estimated bit cost criteria and/or error criteria described above. For example, the encoder 114 may code the pixel group using ICH coding when: (i) for each pixel in the pixel group, the ICH 126 includes one or more entries with a sufficiently similar color value, e.g., the difference in color values is less than a difference threshold value, and (ii) a function output of the number of bits to encode the group and error using ICH coding is less than a corresponding function output of the number bits used to encode the group and error using non-ICH coding.

When determining to use ICH-coding to encode a pixel group, the encoder 114 encodes the pixels as respective index values into the ICH 126 (610). The encoder 114 may select, for a particular pixel to encode, the index value to the entry in the ICH 126 with an identical or similar color value, as determined according to the similarity criteria. The encoder 114 may use a fixed number of bits to indicate the index value in an encoded bit stream. As one example, the encoder 114 may use a fixed number of bits (e.g., 5) to encode an index value for a 32-entry ICH 126. In some variations, the encoder 114 may vary or reduce the number of bits use to indicate a particular index value in the encoded bit stream, e.g., by utilizing variable length coding techniques. The operational parameters 127 may specify a syntax for coding pixel values in the encoded bit stream using index values, and additional examples of syntaxes include using entropy coding, vector coding, or arithmetic coding to represent an index value of the ICH 126 in the encoded bit stream.

The encoder 114 may update the ICH 126 (612), for example to indicate the entries of the referenced index value(s) used to encode the pixel group as most recently used. The encoder 114 may update the ICH 126 at any specified frequency, e.g., after encoding every pixel, every other pixel, every three pixels, etc. When implementing the ICH 126 as an ordered list, the encoder 114 may move the entries referenced by the ICH-encoded pixels to the head of the ordered list. In some variations, when the encoder 114 encodes a pixel using an index value from a portion of the ICH 126 allocated for selected neighboring pixels, the encoder 114 may forego updating the ICH 126 to indicate the color value of the neighboring pixel as recently used. In other variations, the encoder 114 may update the ICH 126 to indicate the color value of the neighboring pixel as recently used at any specified frequency, e.g., at every event of encoding using a selected neighboring pixel, at every other such event, every third such event, etc.

The encoder 114 may provide an indication of ICH encoding for the pixel group in the encoded bit stream (614). The encoder 114 may signal the use of ICH coding for a group in the encoded bit stream, e.g., by explicitly adding an ICH-coding indication in the encoded bit stream applicable to the ICH-encoded pixel group. For example, the operational parameters 127 may specify a syntax for indicating selection of ICH-coding for a particular pixel group.

In the context of DSU-VLC coding, the bit stream encodes a size prediction value as a delta with respect to a predicted size value, and the delta is coded in the prefix of a unit. In this exemplary context, the encoder 114 may indicate selection of ICH-coding for a pixel group by coding an escape code value in the prefix of that group, e.g., a prefix for a Y unit of the pixel group. An escape value may be used in place of a delta size value.

As one option, when the encoder 114 codes a first group of pixels using ICH-coding, the encoder 114 may apply a modified prefix and escape code for a second group of pixels which follows the first group. For example, the encoder 114 may define the prefix of a first unit of the second group such that a particular shortened prefix code is interpreted as being an escape code indicating ICH coding of the second group, and a longer prefix is interpreted as a non-escape code indicating non-ICH coding of the second group. In this example, the encoder 114 may specify a prefix of the first unit of a second group as a prefix value of 0, coded as a "1" bit, to indicate that the second group is coded using ICH-coding. Any prefix value greater than 0, e.g., coded with one or more "0" bits followed by a "1" bit, may indicate that the second group is coded using non-ICH coding. In this example, a prefix value greater than 0 may be understood by subtracting 1 from the prefix value to form the value of a prefix of a group that was not preceded by a group coded not using ICH encoding, e.g., when the first group is encoded using non-ICH encoding.

To illustrate, the encoder 114 may encode a subsequent pixel group using non-ICH coding that immediately follows a previous pixel group encoded using ICH-coding. The encoder 114 may determine the subsequent group to have a first unit with a prefix value equal to 2 when the previous group was not coded using ICH-coding. However, when the encoder 114 codes the previous group using ICH-coding, the encoder 114 may determine the prefix of the first unit of the subsequent pixel group to have a value of 2+1=3. The prefix value of 3 may be coded as "0001". The prefix value of 3, being greater than 0, indicates a prefix value of 3−1=2, and not as an escape code. As such, when multiple consecutive pixel groups are coded using ICH-coding, the number of bits in the prefixes of the second and subsequent consecutive ICH coded blocks may be reduced. The result may be to reduce the number of bits used to code an image or a portion of an image.

The size prediction value that applies to a group that has an escape code may persist until a subsequent group, where it is again applied as the prediction value by the encoder 114. The size prediction may persist until the encoder 114 determines to encode a subsequent group is using DSU-VLC, e.g., using non-ICH coding, after which the encoder 114 uses that subsequent group to produce the next size prediction value.

The encoder 114 may determine to encode the pixel group using non-ICH coding (616). In some variations, the encoder 114 may encode a pixel as an uncompressed color or pixel value in an output bitstream. The encoder 114 may also insert the color values of the non-ICH coded pixels into the ICH 126 (618), e.g., in any of the ways described above. The encoder 114 may indicate the inserted color values as most recently used and update the recency indications of other entries in the ICH 126, e.g., by pushing older entries down in a shift register implementation. The encoder 114 may perform these insertions and updates at any specified frequency, e.g., after encoding a pixel, after encoding every other pixel, after encoding a group, after encoding multiple groups, etc. The encoder 114 may also signal in the encoded bit stream coding of the pixel group using non-ICH coding, e.g., by not adding an escape code into the encoded bit stream. The encoder 114 may continue to process subsequent pixel groups (622).

Figure 7:
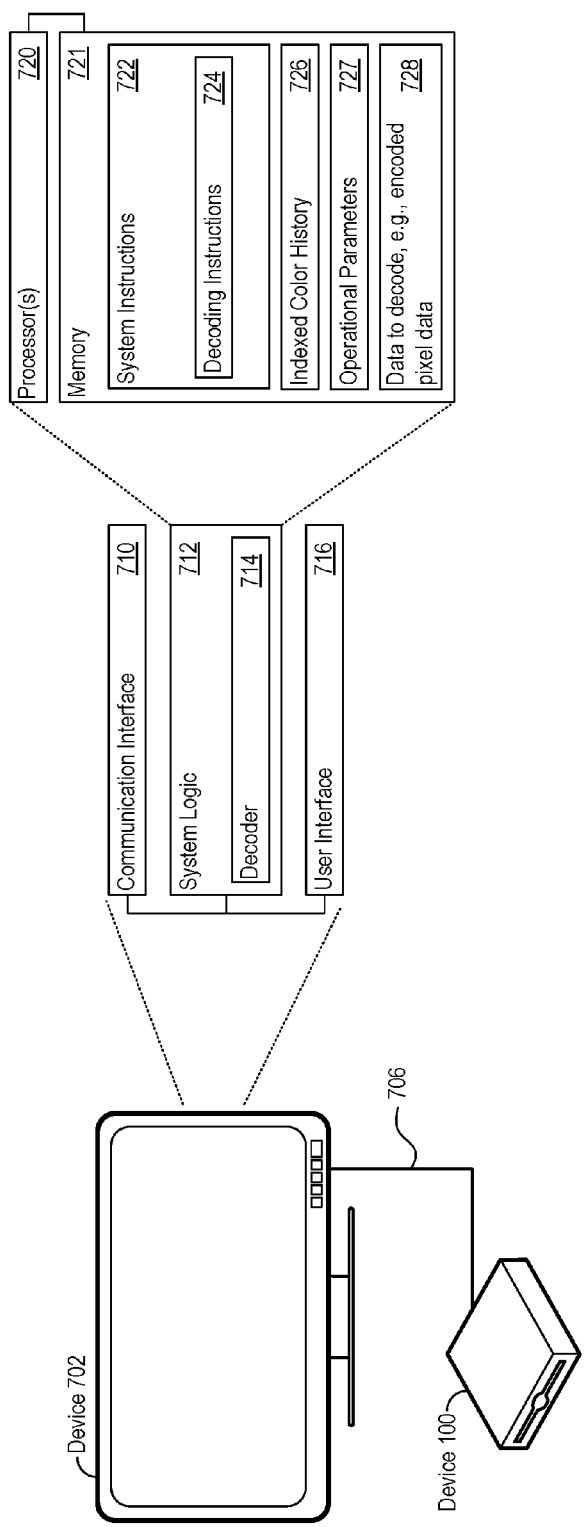
FIG. 7 shows an example of a system for processing image data

FIG. 7 shows an example of a system 700 for image processing. In FIG. 7, a device 702 may decode image data, including image data encoded using ICH and non-ICH coding. In that regard, the device 702 may receive an encoded bit stream from a device 100 that implements an encoder 114, for example through a communication link 706.

In the example shown in FIG. 7, the device 702 includes a communication interface 710, system logic 712, and a user interface 716, e.g., display. The system logic 712 may implement a decoder 714. In some implementations, the system logic 712 includes one or more processors 720 and memories 721. The memory 721 stores, for example, system instructions 722, including decoding instructions 724, an indexed color history 726, operations parameters 727, and data to decode, e.g., encoded pixel data 728. In some implementations, the device 702 implements the decoder 714 and ICH 726 in hardware, e.g., as dedicated image processing circuitry.

The decoder 714 may decode image data previously encoded using ICH coding or non-ICH coding. In that regard, the decoder 714 may implement and maintain the ICH 726, and in a consistent manner as the encoder 114 implements and maintains the ICH 126. Accordingly, the decoder 714 may implement any functionality of the encoder 114 described above, though, in some implementations, the decoder 714 may not implement the selection algorithms or logic used by the encoder 114 to determine whether to code data using ICH coding or non-ICH coding.

In some variations, the encoder 114 and decoder 714 perform identical or consistent operations to update the ICH 126 and ICH 726 respectively. The updates may result in entries in the ICH 126 and ICH 726 that, after decoding a pixel in the decoder 714 and encoding the pixel in the encoder 114, respectively, share consistent attributes. Consistent attributes may refer to identical attributes or attributes that do not vary by more than a specified distance threshold. Consistent attributes may include sharing the same color values, the same index values, and the same recently used indication values, e.g., LRU, MRU, counter values, or ordering of entries.

The encoder 114 and decoder 714 may respectively initialize the ICH 126 and ICH 726 according to consistent initialization criteria. The encoder 114 and decoder 714 may apply consistent criteria in determining whether to insert the color value for a non-ICH coded pixel into the ICH 126 and 726, e.g., by applying the same similarity criteria. The encoder 114 and decoder 714 may use content processing algorithms that behave consistently in terms of maintaining their respective ICH entries, regardless of how the encoder 114 and decoder 714 are implemented.

While the system 700 shows separate devices 100 and 702 that may respectively implement an encoder 114 and a decoder 714, the encoder 114 and decoder 714 may be implemented with a single device. For example, the system logic 112 may implement both the encoder 114 and decoder 714.

FIG. 8 shows an example of logic 800 that a device 702 may implement to decode image data. The decoder 714 may implement the logic 800 as hardware, software, or both, e.g., in software as the decoding instructions 724.

The decoder 714 may initialize the ICH 726 (802) according to consistent initialization criteria applied by the encoder 114. The decoder 714 may obtain data to decode (804). In that regard, the decoder 714 may obtain an encoded bit stream (e.g., compressed image data) previously encoded by the encoder 114.

The decoder 714 determines whether image data for a pixel group was encoded using ICH-coding (806). To do so, the decoder 714 may analyze the encoded bit stream on a per-group basis, and according to the operational parameters 727. The operational parameters 727 may specify a consistent or identical syntax used by the encoder 114 to indicate use of ICH-coding for a pixel group. In that regard, the decoder 714 may decode the prefix for a first unit of a group, and determine that the pixel group was encoded using ICH-encoding in response to identifying an escape code in the prefix.

In some implementations, when a first group is coded using ICH coding, the decoder 714 may interpret the prefix of the first unit of an immediately following group differently from the interpretation that the decoder 714 would obtain when the first group was coded using non-ICH coding. For example, the decoder 714 may determine a prefix of the first unit of a second group which represents a prefix value of 0, coded as a "1" bit, to indicate that the second group is coded using ICH-coding, and determine any prefix value greater than 0, coded with one or more "0" bits followed by a "1" bit, to indicate that the second group is coded using non-ICH coding. Accordingly, the decoder 714 may process a prefix value greater than 0 by subtracting 1 from the prefix value to form the value of a prefix of a unit of a group that was not preceded by a previous group coded using ICH-coding.

For image data for a pixel group encoded using ICH-coding, the decoder 714 may interpret the data for the pixel group as index values into the ICH 727. Accordingly, the decoder 714 may decode the pixels using the index values (810), obtaining color values specified by the respective index values in the encoded bit stream. The decoder 714 may interpret an index value as pointing to an ICH 726 entry, e.g., to a first portion of the ICH 726 indicating recently used color values or to a second portion of the ICH 726 allocated for storing color values of selected reconstructed pixels. The selected reconstructed pixels may be neighboring pixels, or they may have other specified locations or relationships to the current pixels. The decoder 714 may update the corresponding entries in the ICH 726 (812) in a manner consistent with the encoder 114.

When the decoder 714 determines pixel group data was not encoded using ICH-coding, the decoder 714 decodes the pixel data according to a non-ICH decoding method (814) to reconstruct the pixel data. The decoder 714 may insert the color value of reconstructed pixels into the ICH 726 (816), in an entry insertion and/or replacement manner consistent with the encoder 114. The decoder 714 may continue to decode subsequent pixel group data (818).

The methods, devices, and logic described above, including the encoder 114 and decoder 714, may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the encoder 114 or decoder 714 may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A system comprising:
    a memory storing:
        an indexed color history comprising an entry storing a color value of a previously coded pixel;
    encoding circuitry in communication with the memory and configured to:
        obtain a current pixel for encoding;
        determine whether to encode the current pixel by referencing the indexed color history by determining when a color value of the current pixel is within a difference threshold of the color value of the previously coded pixel; and
        when it is determined to encode the current pixel using the indexed color history:
            encode the pixel as an index value referencing the entry in the indexed color history.

2. The system of claim 1, wherein the color value of the previously coded pixel is within the difference threshold only when the color value of the current pixel is identical to the color value of the previously coded pixel.

3. The system of claim 1, wherein the color value of the previously coded pixel is within the difference threshold when a component value of the color value of the current pixel is within the difference threshold from a corresponding component value of the color value of the previously coded pixel.

4. The system of claim 1, wherein the encoding circuitry is further configured to:
    access a quantization parameter for the current pixel; and
    determine the difference threshold as a function of the quantization parameter for the current pixel.

5. The system of claim 4, wherein the encoding circuitry is configured to determine the difference threshold as a maximum quantization error for the quantization parameter for the current pixel.

6. The system of claim 4, wherein the encodings circuitry is configured to determine the difference threshold as:
    a maximum quantization error based on the quantization parameter for the current pixel when the maximum quantization error does not exceed an error threshold; and
    a value less than the maximum quantization error for the quantization parameter for the current pixel when the maximum quantization error exceeds the error threshold.

7. The system of claim 1, wherein the encoding circuitry is further configured to explicitly signal, in an encoded bit stream, that the current pixel is encoded as the index value into the indexed color history.

8. The system of claim 1, wherein the encoding circuitry is further configured to:
    determine not to encode the current pixel using the indexed color history when no color value stored in the indexed color history is within the difference threshold for the color value of the current pixel; and.
    encode the current pixel without referencing the indexed color history.

9. The system of claim 8, wherein the encoding circuitry is further configured to:
    when it is determined not to encode the current pixel using the indexed color history:
        insert the color value of the current pixel into the indexed color history; and
        indicate the color value of the current pixel as a most recently used color value.

10. The system of claim 9, wherein the encoding circuitry is further configured to insert the color value of the current pixel into the indexed color history by removing a least recently used color value from the indexed color history.

11. A method comprising:
    obtaining image data for a current pixel, the image data comprising a color value of the current pixel;
    determining to encode the current pixel by referencing an indexed color history when:
        the indexed color history includes a history entry storing a color value of a previously coded pixel that meets a similarity criterion with respect to the color value for the current pixel; and
        an evaluation function of bit length indicates that encoding using the indexed color history has a compression advantage over encoding without using the indexed color history; and
    encoding the current pixel by referencing the history entry in indexed color history.

12. The method of claim 11, where encoding the current pixel by referencing the history entry comprises encoding the current pixel as an index value corresponding to the history entry.

13. The method of claim 11, further comprising maintaining the indexed color history to indicate that the history entry is a most recently used entry of the indexed color history.

14. The method of claim 11, further comprising:
    signaling in an encoded bit stream that the current pixel was encoded by referencing the indexed color history.

15. The method of claim 14, where signaling comprises coding an escape code into a prefix corresponding to the current pixel.

16. A product comprising:
    a machine-readable medium other than a transitory signal; and
    instructions stored on the machine-readable medium that when executed by a processor, cause the processor to:
        obtain a current pixel for encoding;
        access an indexed color history to determine whether an entry in the indexed color history stores a color value for a previously coded pixel for which a color value for the current pixel is within a difference threshold; and
        when the indexed color history includes an entry for which the color value for the current pixel is within the difference threshold:
            encode the pixel as an index value to the entry; and
        when the indexed color history does not include an entry for which the color value for the current pixel is within the difference threshold:
            encode the pixel without referencing the indexed color history.

17. The product of claim 16, where the instructions further cause the processor to:
    determine that the indexed color history includes multiple entries that store a color value for which the current pixel is within the difference threshold, and in response:
    select an index value of one of the multiple entries as the index value to encode the pixel.

18. The product of claim 17, where the instructions cause the processor to select the index value of one of the multiple entries by:
    identifying which of the multiple entries has a color value with a lowest sum of absolute differences of color components.

19. The product of claim 16, where the instructions are further configured to:
    when the indexed color history does not include an entry for which the color value for the current pixel is within the difference threshold:
        store the color value of the current pixel as a new entry in the index color history.

20. The system of claim 7, where the encoding circuitry configured to explicitly signal that the current pixel is encoded as the index value into the indexed color history by inserting an escape code into the encoded bit stream.

* * * * *